RAIMO M. KRONQVIST Inventor:

Bierman + Bierman

Nov. 5, 1968   R. M. KRONQVIST   3,409,100
VEHICLE WITH ADDITIONAL LIFTING WHEELS FOR STEERING
Filed April 4, 1966   7 Sheets-Sheet 1

RAIMO M. KRONOVIST Inventor:

Raimo M. Kronqvist Inventor:

Bierman + Bierman

Nov. 5, 1968 R. M. KRONQVIST 3,409,100
VEHICLE WITH ADDITIONAL LIFTING WHEELS FOR STEERING
Filed April 4, 1966 7 Sheets-Sheet 2

RAIMO M. KRONQVIST Inventor:

Bierman + Bierman

RAIMO M. KRONQVIST Inventor:

Bierman + Bierman

Nov. 5, 1968  R. M. KRONQVIST  3,409,100
VEHICLE WITH ADDITIONAL LIFTING WHEELS FOR STEERING
Filed April 4, 1966  7 Sheets-Sheet 4

RAIMO M KRONQVIST Inventor:

Bierman + Bierman

RAIMO M. KRONOVIST Inventor:

Bierman + Bierman

Nov. 5, 1968   R. M. KRONQVIST   3,409,100
VEHICLE WITH ADDITIONAL LIFTING WHEELS FOR STEERING
Filed April 4, 1966   7 Sheets-Sheet 6

Raimo M. Kronqvist Inventor:

RAIMO M. KRONOVIST Inventor:

Bierman & Bierman

Nov. 5, 1968  R. M. KRONQVIST  3,409,100
VEHICLE WITH ADDITIONAL LIFTING WHEELS FOR STEERING
Filed April 4, 1966  7 Sheets-Sheet 7

Raimo M. Kronqvist Inventor:

3,409,100

VEHICLE WITH ADDITIONAL LIFTING WHEELS FOR STEERING

Raimo Mikael Kronqvist, Viherkallio B-16, Viherlaakso, Finland

Filed Apr. 4, 1966, Ser. No. 539,845
7 Claims. (Cl. 180—6.54)

ABSTRACT OF THE DISCLOSURE

This invention relates to a running device, especially intended for terrain vehicles. The invention can be applied as such a running device for terrain vehicles, in which wheels are used as drive means. It includes driving treads or wheels on the chassis, a lifting tread or wheel on at least one side and mounted on a lever which is adapted to lower the lifting tread or wheel into engagement with the ground to lift at least one driving tread or wheel off of the ground.

The most important characteristics of such terrain vehicles are a good ability to advance and turn. For advancing it is recommended to arrange drive on several wheels, preferably on all of them. Such terrain vehicles which are driven by several wheels, are well known previously. In those vehicles the steering is usually arranged either by wheel-steering or by a double frame and a steering joint between them.

For obtaining the shortest possible turning radius, the set of axles must, when any of the said methods is applied, be provided with differentials, which in turn must be provided with differential locks to maintain a good ability to advance. In wheel-steered vehicles the driving axles must also be provided with universal joints to make possible the turning and transmission of wheels. The application of these steering methods result accordingly in complicated and costly constructions, without obtaining the best possible result in the turning ability, however.

The said disadvantage are overcome by the present invention. Good abilities to advance and turn are obtained. The construction will, however, be uncomplicated and inexpensive.

The invention can be applied to terrain vehicles of any size.

In addition to wheeled vehicles, it can be applied to vehicles with endless treads and to vehicles with a combined use of wheels and treads.

The invention can also be applied to other running devices than those intended for terrain vehicles. It can, for example, be used in devices intended as toys. Small machines, like motor-compressors, can be provided with this running device. Moreover, the invention is profitable as applied to various lifting cranes and digging machines.

One important sphere of application consists of forest tractors and jeeps intended for military use. The running device can also be used in tanks, draw vehicles or carriages for guns.

The present running device also operates profitably as a very long construction, so that large vehicles of entirely new type become possible.

The invention will now be described in details with reference to the accompanying drawings, giving a number of different embodiments, as follows.

Figure 4:
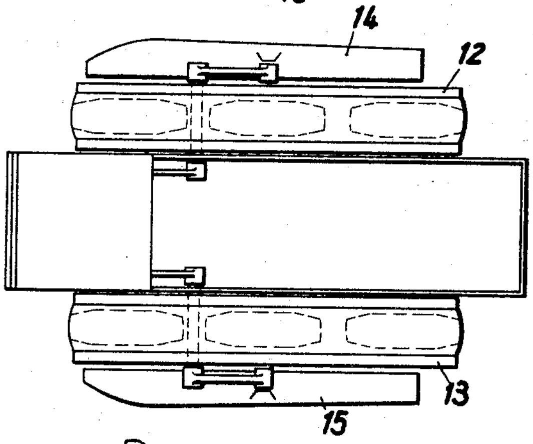

FIGURE 4 a top plan view of the same.

Figure 5:
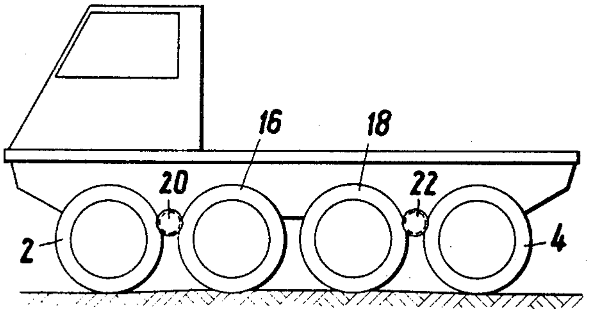
Figure 6:
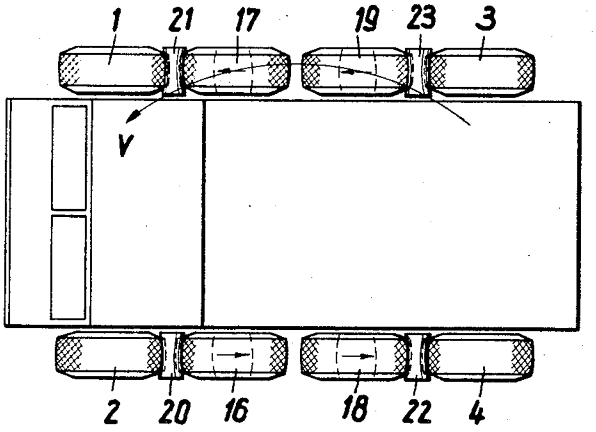

FIGURE 5 shows a side view of a vehicle, provided with four driving wheels and four lifting wheels with a drive device, and FIGURE 6 a top plan view of the same.

Figure 7:
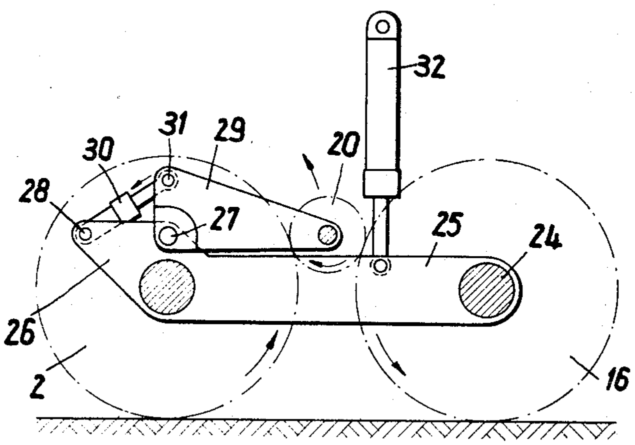

FIGURE 7 shows a side view of an operation device for lifting wheels, and

Figure 8:
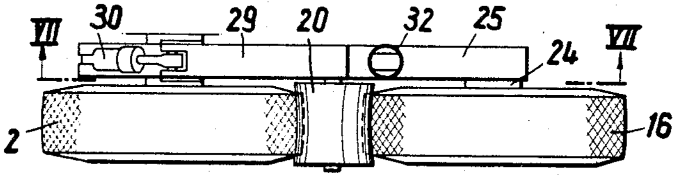

FIGURE 8 a top plan view of the same.

FIGURES 9–12 show schematically crossing of a precipice.

FIGURES 13–16 show schematically crossing of a broad ditch.

FIGURES 17–20 show schematically crossing of a narrow ditch.

Figure 21:
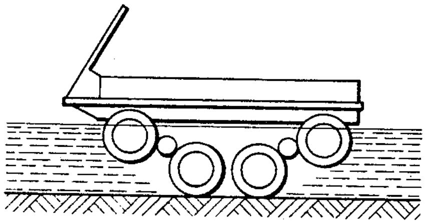

FIGURE 21 shows schematically running in water.

Figure 22:
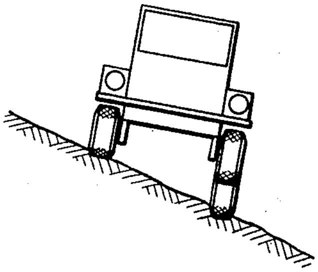

FIGURE 22 shows schematically running on a slope.

Figure 23:
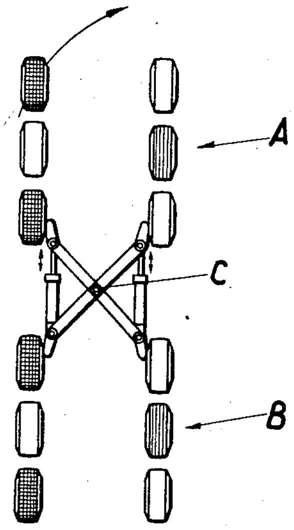

FIGURE 23 shows schematically a combined construction.

Figure 24:
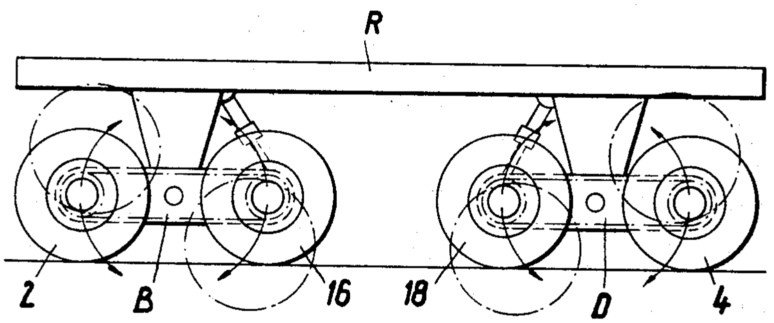

FIGURE 24 shows a side view of an embodiment for a bogie and

Figure 25:
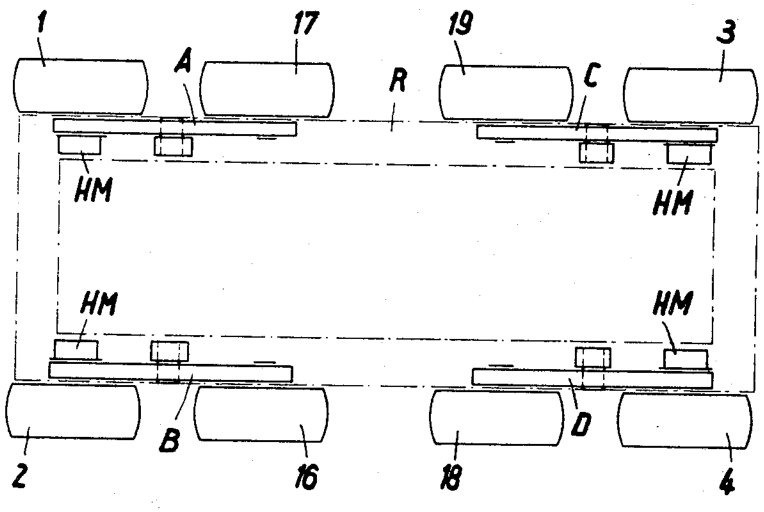

FIGURE 25 a top plan view of the same.

Figure 26:
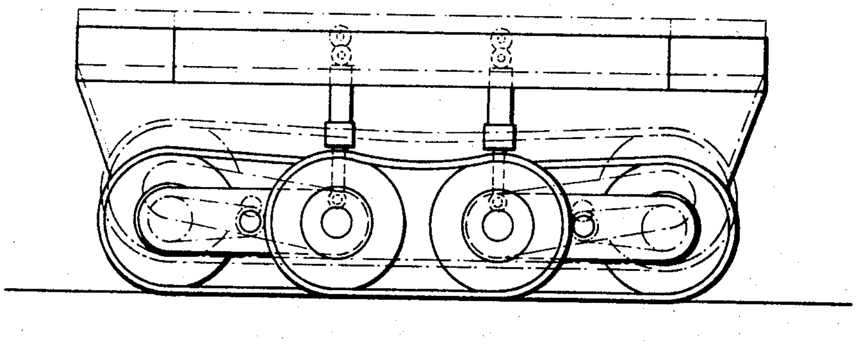

FIGURE 26 shows a side view of a double tread (track) and

Figure 27:
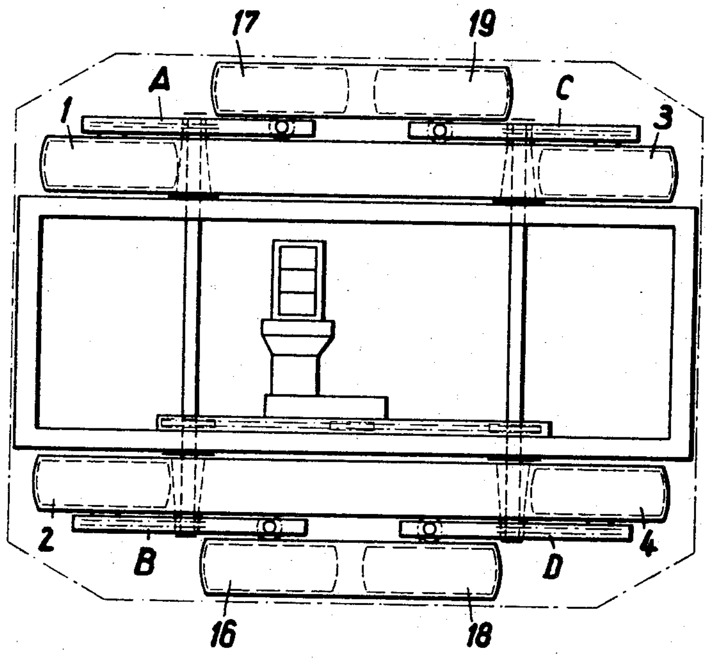

FIGURE 27 a top plan view of the same.

Figure 28:
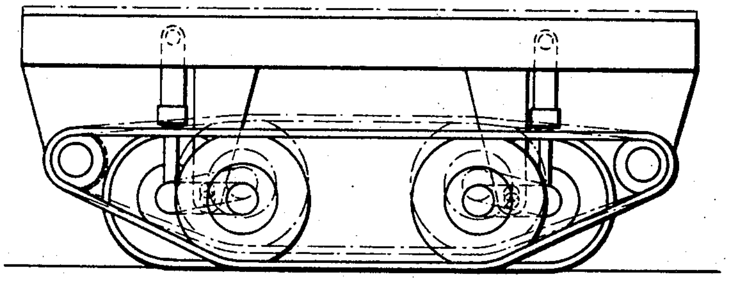

FIGURE 28 shows a side view of another double tread and

Figure 29:
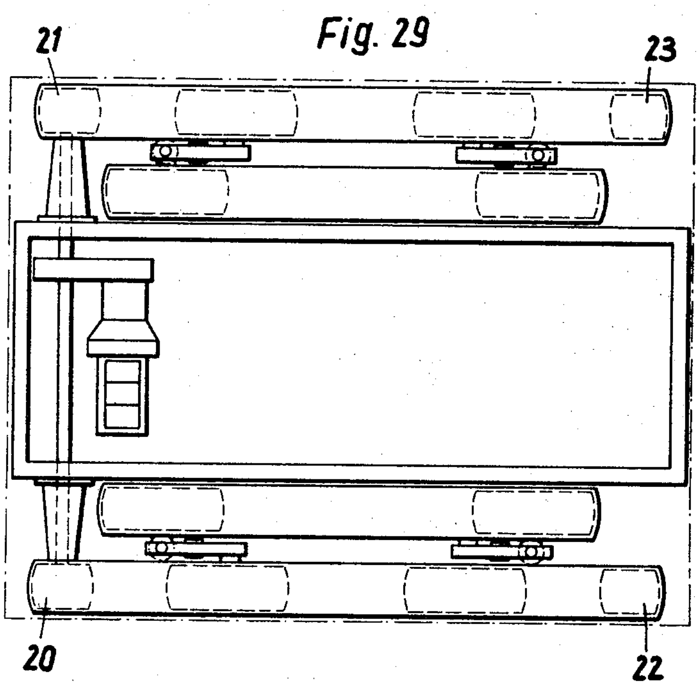

FIGURE 29 a top plan view of the same.

Figure 1:
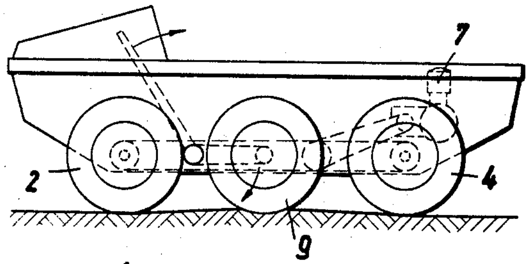
FIGURE 1 shows a side view of a small-sized, four-wheel driven jeep, provided with two lifting wheels.
Figure 2:
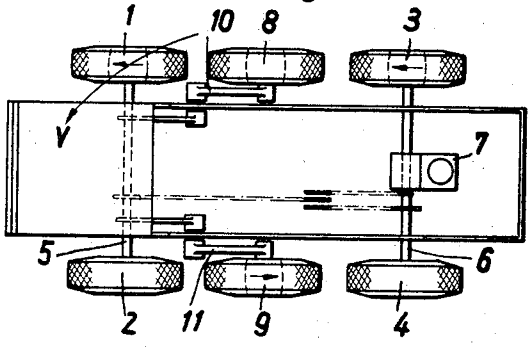
FIGURE 2 shows a schematic top plan view of the said jeep.

The vehicle shown in FIGURES 1–2 is provided with four driving wheels 1, 2, 3 and 4. The front driving wheels 1, 2 are attached to a common axle 5 and the rear driving wheels 3, 4 to another common axle 6. The axles 5 and 6 are driven by a driving motor 7 by coupling, transmission, chains and chain wheels.

There is a lifting wheel 8 between the wheels 1 and 3 and a lifting wheel 9 between the wheels 2 and 4. The lifting wheel 8 is rotatably mounted on lever 10 and the lifting wheel 9 on the lever 11.

FIGURE 2 illustrates a left-hand turn of the vehicle in the direction shown by the arrow V. For this purpose the lever 11 and the lifting wheel 9 are pressed down until the driving wheels 2 and 4 of this left side rise from the ground. When the lifting wheel 9 is now braked, the driving wheels 1 and 3 turn the vehicle to the left. The turning takes place the more sharply, the more vigorously braking is carried out. The sharpest turn (the shortest turning radius) takes place around the lifting wheel 9.

Turning to the right is carried out correspondingly, whereat the right-hand driving wheels 1 and 3 are raised from the ground by pressing down the lifting wheel 8 with the lever 10. For driving with slight turns it is sufficient to press down the two lifting wheels moderately, whereat the running device still runs straight on, and to brake then the lifting wheel at the inner curve. It is now unnecessary to press down the lifting wheels separately; thus the driver can operate with less complicated steering movements.

The operation of the lifting wheels 8 and 9 can be arranged hydraulically or mechanically. The last-mentioned method is shown in FIGURES 1–2, whereat the levers 10 and 11 can be turned by means of hand cranks. When a suitable crank ratio is used, hand force is sufficient for lifting up the sides of light vehicles. It is also possible to arrange the braking force to press down the lifting wheel.

Hand levers are coupled to levers 10 and 11 with pins, supported by bearings on the frame. As a different solution, a latch clutch can also be used so that the lifting wheel can freely follow the variations of terrain, while the hand cranks remain in their place. When the hand crank is pulled, the latch clutch grips the lever of the lifting wheel, whereat the whole movement distance of the hand crank is utilised and the largest possible movement is obtained for the lifting wheel.

The lifting wheels can freely follow the variations of terrain, but shock absorbers and/or springs can also be arranged for the lifting wheels.

Although the lifting wheels in FIGURES 1–2 are of the same size as the driving wheels, smaller or bigger lifting wheels can alternatively be used, too.

More free space is obtained below the vehicle, when the wheels are mounted with short axle pins so that the axles 5 and 6, which cross the vehicle, become unnecessary. Then it also becomes possible to stagger the driving wheels in the direction of movement at different places of the running device. Staggering can be used for the lifting wheels, too.

Although the FIGURES 1–2 show a very uncomplicated and inexpensive running device, this can be made even less complicated by replacing the lifting wheels by lifting shoes, which can be pressed against the ground. Braking of this side takes place simultaneously. It can be increased by changing the position of the lifting shoe or by providing the lifting shoes with gliding obstacles. Simple lifting shoes can be used in certain terrain conditions. For running on snow the shoes are of ski-type.

Figure 3:
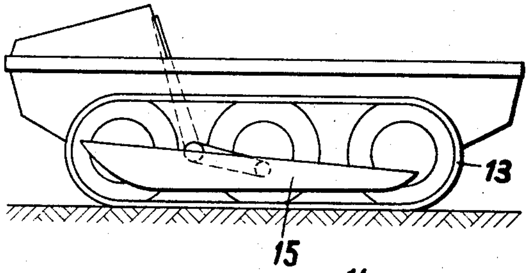
FIGURE 3 shows a side view of a vehicle provided with treads.

FIGURES 3–4 show a running device according to FIGURES 1–2, provided with treads 12. 13. The mechanism of the lifting wheels is arranged to influence the gliding shoes, placed outside the treads, for instance skis 14, 15, used for braking. As lifting means, treads can also be used.

In present endless track vehicles the steering is arranged so that the drive of one tread is stopped, whereat the opposite tread turns the vehicle around the stopped tread. This involves the disadvantage that both treads resist the turning with all their length. For eliminating this disadvantage it is well-known to use wheels which are arranged to be pressed down, the wheels being situated at the treads. When applying the invention to endless track vehicles, the whole tread can be lifted up from the running ground.

In tread running devices, intended as toys, this invention can be applied so simply that, outside the treads, small lifting means are mounted, by which the inner tread can be lifted up from the ground. No special brakes are needed, as the lifting element itself brakes against the ground. The treads can be provided with a continuous drive, which makes the mechanism profitable particularly regarding the power transmission.

Tread supporters and small tread wheels can, of course, be used in the well-known way for tread running devices. The running device in FIGURES 1, 2 and 3, 4 is intended to be of a type which can be easily changed from a wheel-driven to a tread-driven and vice versa.

Devices shown in FIGURES 1–4 are described above in details, as the fundamental idea of the invention appears in the best way in connection with these simple embodiments. This does not mean, however, that the invention would be limited to such devices, neither that they would even be considered for a more general use. It is possible, on the contrary, that the invention will come into general use in connection with embodiments of a different type. Some of these embodiments are described in the following.

FIGURES 5 and 6 show a terrain vehicle provided with four driving wheels 1, 2, 3, 4 and four lifting wheels 16, 17, 18 and 19. Drive has been arranged for the lifting wheels by means of friction rollers 20, 21, 22, 23, which can be pressed against the wheels and removed from them.

FIGURES 7–8 show a solution for pressing down and lifting up the lifting wheels and for using them provisionally as driving wheels. The lifting wheel 16 is mounted rotatably on the axle 24, situated at the end of the swinging arm 25. The other end of the swinging arm 25 is mounted with bearings on the axle of the driving wheel 2 and equipped with a projecting part 26, provided with bearings 27 and 28. The supporting frame 29 of the friction roller 20 is mounted with bearings on the point 27 and the hydraulic cylinder 30 is mounted on point 28, while this piston lever is mounted with bearings on the supporting frame 29 at the point 31. For pressing down the lifting wheel, the mechanism also includes a hydraulic cylinder 32, mounted on the frame of the running device, while the piston lever is mounted on the swinging arm 25. The bearing points 27, 28 and 31 are placed in relation to the bearing centres of the wheels so that the friction roller 20 can at any time be pressed against the wheels 2 and 16, independently of the position of the lifting wheel.

When a driving movement is wanted for the lifting wheel, the friction roller is pressed against the lifting wheel, whereat it transmits the momentum of the driving wheel upon the lifting wheel, as shown by the arrows in FIGURE 7.

The mechanisms are arranged correspondingly for other lifting wheels, too, which are all provided with brakes. Alternatively, at least one of the lifting wheels on each side is provided with a brake.

A vehicle, provided with the preceding running device, can be turned so that all the lifting wheels 16–19 are pressed down with hydraulic devices 32, in addition whereto a drive is coupled on the lifting wheels of the other side (right-hand lifting wheels 17 and 19 in FIGURE 6), while the lifting wheels of the opposite side are braked. In the case shown by FIGURE 6 an arrow V illustrates the vehicle turning to the left. It appears that the turning radius becomes very short. For rounding a turn, only one of the lifting wheels can be pressed down at the inner curve. The vehicle can also be controlled by the lifting wheels in other ways, especially in curves, by pulling, lifting and braking. Thus the lifting element could generally rather be called as an auxiliary element.

Figures 9, 10, 11, 12, 13, 14, 15, 16, 17, 18, 19, 20:
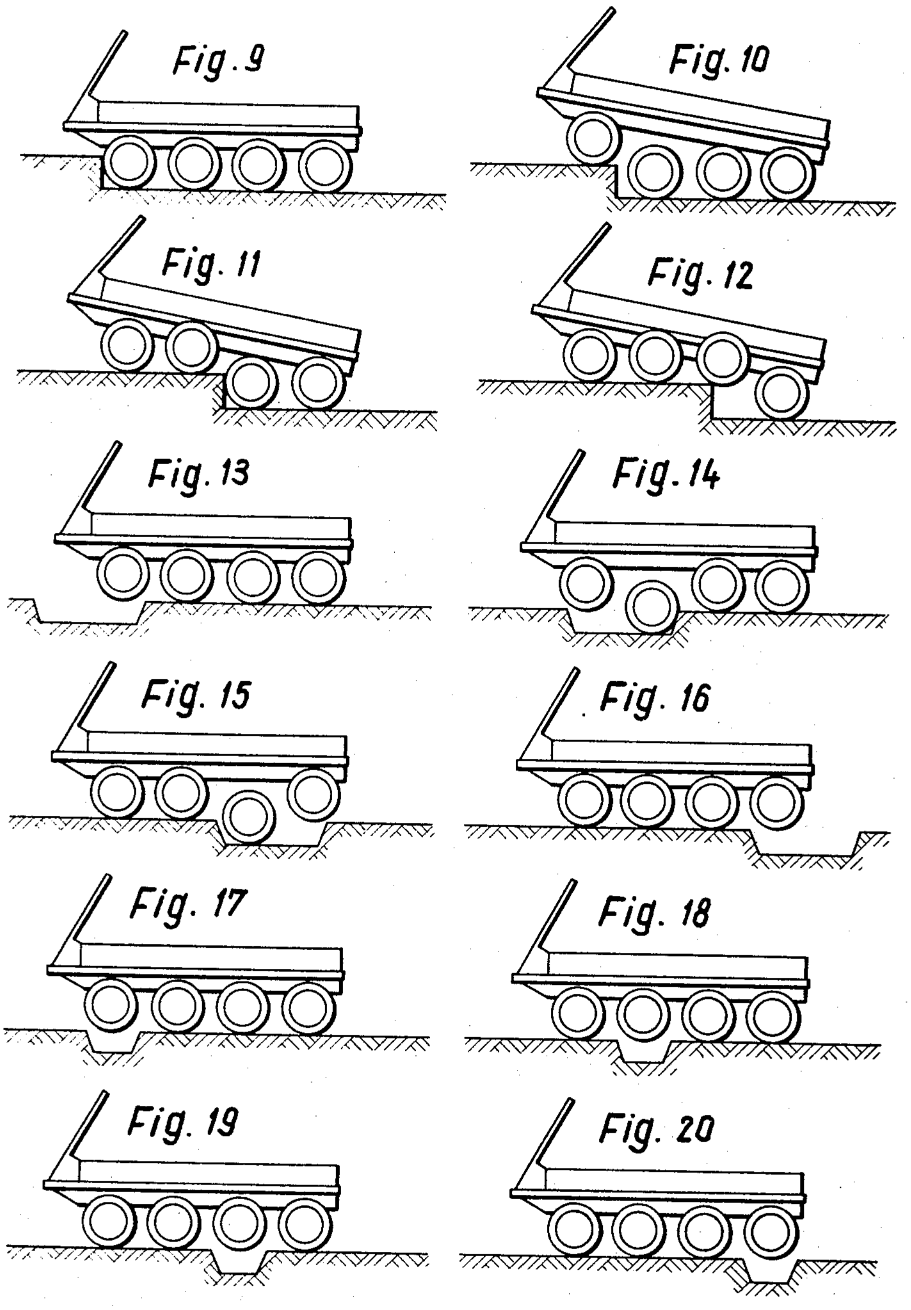

By the said arrangement of the lifting wheels other important advantages are also obtained. Of these the FIGURES 9–12 show the crossing of an embankment. In the FIGURE 9 the front driving wheels of the vehicle have met a steep precipice. For crossing this, the front part of the vehicle is lifted up by pressing down the front lifting wheels as shown in the FIGURE 10. When the front driving wheels have arrived at the top of the embankment, the front lifting wheels can be lifted up as shown in FIGURE 11. For helping the rear part, the rear lifting wheels can be lifted up, as illustrated by FIGURE 12. In suitable phases there is a drive on the lifting wheels, too. The embankment can also be crossed slantwise, whereat the advantage is due to the fact that the lifting wheels are independent of each other.

FIGURES 13–16 illustrate the advantages of the present running device when the vehicle crosses a broad ditch. By means of the front lifting wheels the cam of the vehicle is hindered from falling down into the ditch, FIGURE 13, and by means of the rear lifting wheels the rear part of the vehicle is kept up or, when backing the vehicle across the ditch, it is helped in the same way as the front part in FIGURE 13.

For crossing narrow ditches, it is advisable to keep up the lifting wheels according to FIGURES 17–20. By lifting up the lifting wheels above the driving wheels, the vehicle is prevented from getting stuck in different obstacles, in case the lifting wheels are not provided with drive.

FIGURE 21 shows the advantages of the running device in water or in snow. It is also useful for running on slopes, as illustrated by FIGURE 22.

The above-mentioned methods of application are only examples to illustrate the advantages of the present running device. There is, of course, nothing to hinder that the vehicle is used in other ways, too, especially as the running device offers a considerable number of alternative combinations, among which the best methods can be selected, on the basis of experiences, for clearing different ground obstacles. The running device can also be applied as an auxiliary device for conventional vehicles.

When in the case shown in FIGURES 5–22, the lifting wheels or a part of these wheels, situated in the turning direction, are braked, operated more slowly or in the opposite direction, the turning takes place at a very small turning radius—in a borderline case the vehicle turns on its place.

By the lifting means the vehicle can be helped to clear difficult ground obstacles, as stated above. The lifting means are then arranged so that the front or the rear part, either side or the whole vehicle can be lifted up. In case there is one lifting element on each side, they can be arranged longitudinally transferable so that lifting can take place either in front of or behind the centre of gravity, depending on whether the purpose is to lift up the front or the rear part of the vehicle. The lifting elements can also be permanently placed so that, by simultaneous pressing, the front of the vehicle goes up. In certain cases the moving of the centre of gravity in relation to the lifting elements can also be considered. If the mechanism is of the type in which there are on each side two or more lifting means one after another, the front part of the vehicle can be lifted up by the front lifting means and the rear part by the rearmost lifting means. By pressing simultaneously the lifting means of one side, the transversal inclination of the vehicle can be changed. The whole vehicle can be lifted up by using simultaneously all the lifting means.

It appears from the above-stated that although in the invented running device the lifting element makes possible turning in a new way, it makes possible other measures which facilitate running, too. Thus the lifting element can generally rather be called as an auxiliary element. The concept "lifting" means lifting off from the running ground, as well as reducing of weight, whereat the contact with the running ground can be maintained.

It can also be understood that when speaking about pressing down the lifting element so that the drive element rises, lifting of the drive element corresponds to this, while the lifting element remains to support.

It is recommended in general that the lifting means are situated in the longitudinal direction between the driving wheels, but a different location of them can also be considered. The lifting means can likewise be situated in transversal direction and staggered in different ways in relation to the driving wheels. It is recommended to use special tyres in terrain vehicles, the characteristics of which tyres best correspond to the conditions of application.

It is profitable to provide the driving wheels of the present vehicle with tyres, the contact surface of which is grooved as consecutive lamellas, which are in the same direction as the turning radius at the moment they touch the ground. The form resistance of such a tyre generates in the axle-direction a component, which tends to turn the vehicle. As according to the invention the same driving wheels are always used when turning to the same direction, it is possible to obtain, by setting up tyre profiles as stated above, a couple of forces with a parallel influence, and to make hereby turning more effective. The inclination of tyres in the way mentioned above can also be utilised in order to improve the turning capacity.

FIGURE 23 shows schematically a combined operation, in which the running device consists of two parts A and B. These are connected with each other by a universal joint C, operated by a hydraulic cylinder. Each part A and B is provided with four driving wheels and with two lifting wheels between them. FIGURE 23 shows a right-hand turn, where the driving wheels are marked by cross-ruling and the lifting wheels by parallel ruling.

In the embodiment according to FIGURES 24–25 the driving wheels 1, 2, 3 and 4 and the lifting wheels 16, 17, 18 and 19 are arranged by pairs on bogies A, B, C and D, which are able, in the well-known way, to turn vertically, supported by the frame R.

In the case illustrated by the drawing all bogie constructions are of the same kind, so the number of different parts is as small as possible, which results in an unexpensive construction.

The power transmission is arranged for the driving wheels by hydromotors HM. These can be operated at a low or a high speed, and be provided with worm gear.

The drawing illustrates a case in which the drive has been transferred from the driving wheels also to lifting wheels by means of a chain transmission, whereat the bogie frame is used as a protective socket for the chains and chain wheels, which also tends to make the construction simpler and cheaper.

The power transmission can be arranged only for the actual driving wheels 1–4, whereat the lifting wheels are provided with brakes. One possibility is also to use intermediate rollers between the driving wheels and pressure wheels.

When the vehicle runs straight forward or backward the bogies act in the well-known way, whereat the wheels follow the ruggedness of the terrain. The bogies are thus able to turn vertically, either completely free or in the moderated way. In addition to this, the lifting wheels or the lifting and the driving wheels are arranged, preferably hydraulically, to be pressed down, whereat the corresponding bogie will turn. This also results in a larger space below the vehicle.

By arranging the distance of the driving wheel from the turning point of the bogie longer than the distance of the lifting wheel, the driving wheel can be raised considerably also by pressing down the lifting wheel only slightly, which is profitable in crossing high terrain obstacles and in turning. For rounding a turn, the vehicle can be provided by steering gears of a well-known type, by which gears the drive on the inner curve side is braked. A separate set of steering gears is, however, unnecessary in the hydraulic driving system, shown in FIGURES 24–25.

The present running device involves many advantages. It is driven by eight wheels and adapts itself well to the ruggedness of the terrain. The wheels of the running device can be pressed down and raised as needed. The running device can be provided with turning capacity also when a very long construction is used. The wheel device can in no time be provided with treads. As these are provided with a drive at both ends, simple treads can be used, which could glide in case only one end would be provided with drive. One side can either be provided with one tread over all the wheels or the wheels belonging to the same bogie can be provided with its own track.

FIGURES 26–27 show another embodiment of a running device, also provided with four driving wheels 1–4 and four lifting wheels 16–19. The wheels are attached by pairs to bogies A, B, C and D. A special characteristic is, however, the sidelong staggering of the bogie wheels. The FIGURES 26–27 show a staggering, in which the lifting wheels are situated outside the driving wheels. In a track construction, illustrated by FIGURES 26–27, the tracks of the driving wheels act as driving tracks and the tracks of the lifting wheels as pressure and braking tracks.

An advantage is caused by the fact that the running device does not need any special steering switch. In a typical endless track vehicle only one of the wheels of the driving track can be provided with drive. When necessary, extra wheels can be used especially to support the driving track. In addition, the running device according to FIGURES 26–27 involve the advantage of a large supporting area; this will hinder the running device from sinking down also on very soft ground.

The FIGURES 28—29 show a third embodiment, differing structurally from the running device of the FIGURES 26–27 in the respect that the first-mentioned is provided with two pairs of extra wheels, the wheels being marked with reference numbers 20, 21, 22 and 23. Of these the FIGURES 20 and 21 are in fixed bearings in relation to the frame and act as driving wheels of the tracks. This arrangement involves first of all the advantage that the power transmission can thus be arranged more easily, compared with the above-mentioned embodiments, in which the power transmission is arranged to the driving wheel which moves with the bogie. The wheels 22 and 23 can also be mounted with bearings to the frame and they can be used for driving the tracks. They can also be arranged as adjusting wheels of the tracks. The simplifying of the transmission of power in the above-mentioned sense can be carried out through the bearing point of the track, in the embodiments according to FIGURES 24–27. As to the FIGURES 28–29, it is to be remarked moreover that the outer tracks are driving tracks and the inner are pressure and braking tracks.

The foregoing describes many embodiments of the present invention, but it is clear that the invention is not confined to these only; it can be varied in numerous ways within the following claims.

For example, the lifting wheels can be provided with a turning movement, in addition to the lifting movement. In this case some of the driving wheels can be lifted up by means of the lifting wheels and the vehicle can be steered by turning the lifting wheels, which can be advantageous on good roads.

According to one alternative, the drive elements consist of two broad rollers, between which there is one lifting wheel on each side. Turning is carried out by pressing or braking one lifting wheel or by pressing and turning both lifting wheels. In addition to this, the lifting wheel at the inner curve can be pressed lower than the outer wheel. The suspension of the lifting wheels can be of that kind that the turning movement causes the pressing down, or vice versa. The lifting can also be arranged in such a way that it becomes the bigger, the larger the turning angle is.

In case the pressing down of the lifting wheels is arranged hydraulically, as advisable, the hydraulic pressure can be used to indicate the weight of the load. The one side can be weighed first, thereafter the other side, whereat the total of the weighing results indicates the total weight. The location of the centre of gravity in the load, the specific gravity of which is known, and the critical inclination limit can be indicated in this way, too. The term "tread" as used in the claims is intended to include wheels.

What I claim is:

1. A running device for vehicles comprising a rigid vehicle chassis including driving treads for ground contact to propel the vehicle, additional lifting treads which are off the ground in normal driving, and means by which said lifting treads are lowered into forcible ground contact and to an extent to cause them to elevate at least one of the driven treads, and braking means for said lifting treads, wherein the driving wheels are four in number and are spaced apart in pairs, the lifting wheels being non-driven and being located between the pairs of driving wheels, mounting means for the lifting wheels including pivoted levers, and means for selectively pivoting said levers about the axis of the driving treads to thereby bring the peripheries of either of the lifting wheels into ground contact to provide a lifting force sufficient to elevate at least one of the driving wheels from the ground.

2. A running device according to claim 1, wherein the lifting wheels are arranged to be driven from at least one of the driving wheels, and a roller operative from said driving wheels and peripherally contacting one of the lifting wheels.

3. A running device according to claim 2, whereby the lifting wheels are coupled to hydraulic means for lowering them into ground contact.

4. A running device according to claim 1, wherein the driving wheels are arranged in pairs, the lifting wheels being arranged between the pairs of driving wheels, means for raising or lowering the lifting wheels to bring said wheels when lowered, into selective ground contact and provide a lifting force sufficient to elevate at least one of the driving wheels from ground contact, and rollers rotated from the driving wheels for contacting with and driving the lifting wheels.

5. A running device according to claim 1, wherein at least one of the lifting wheels is arranged to operate from at least one of the driving wheels by means of an intermediate roller, characterized by the fact that the intermediate roller is mounted on bearings at a location where it can be brought into contact with the wheels in all positions of said lifting wheels.

6. A running device according to claim 1, comprising at least two of the lifting treads on both sides of the vehicle, which treads are so located that the center of gravity of the vehicle remains between the said lifting treads.

7. A running device according to claim 6, characterized by the fact that the lifting wheels are provided with hydraulic hub motors.

References Cited

UNITED STATES PATENTS

| | | | |
|---|---|---|---|
| 2,391,948 | 1/1946 | Couse | 180—22 |
| 2,393,324 | 1/1946 | Joy | 180—22 X |
| 2,426,342 | 8/1947 | Couse | 180—22 X |
| 3,275,091 | 9/1966 | Steck | 180—22 |
| 3,299,978 | 1/1967 | Sponsler | 180—22 X |
| 2,305,072 | 12/1942 | Fetters | 180—6.54 X |
| 2,380,181 | 7/1945 | Krenzien | 180—74 |
| 3,231,036 | 1/1966 | Appenrodt | 180—9.24 X |
| 3,351,037 | 11/1967 | Meili | 180—41 X |

FOREIGN PATENTS

| | | |
|---|---|---|
| 802,865 | 10/1958 | Great Britain. |
| 875,691 | 8/1961 | Great Britain. |
| 96,931 | 10/1960 | Norway. |
| 541,253 | 11/1941 | Great Britain. |

RICHARD J. JOHNSON, *Primary Examiner.*